(12) United States Patent
Peinemann et al.

(10) Patent No.: US 6,719,112 B2
(45) Date of Patent: *Apr. 13, 2004

(54) TORSION DAMPING MECHANISM WITH AUXILIARY MASS

(75) Inventors: Bernd Peinemann, Niederwerrn (DE); Jürgen Weth, Niederwernn (DE); Cora Carlson, Hambach (DE); Paul Kraus, Niederwerrn (DE); Reinhard Feldhaus, Poppenhausen (DE); Hartmut Bach, Schweinfurt (DE)

(73) Assignee: Mannesmann Sachs AG, Schweinfurt (DE)

( * ) Notice: Subject to any disclaimer, the term of this patent is extended or adjusted under 35 U.S.C. 154(b) by 80 days.

This patent is subject to a terminal disclaimer.

(21) Appl. No.: 09/972,278

(22) Filed: Oct. 5, 2001

(65) Prior Publication Data

US 2002/0046916 A1 Apr. 25, 2002

(30) Foreign Application Priority Data

Oct. 25, 2000 (DE) .......................... 100 52 786

(51) Int. Cl.[7] ............................. F16D 13/68
(52) U.S. Cl. .................. 192/70.17; 192/30 V; 192/212
(58) Field of Search ................ 192/30 V, 212, 192/70.17; 74/574; 464/61, 68

(56) References Cited

U.S. PATENT DOCUMENTS

| 4,813,295 | A | * | 3/1989 | Drexl et al. ................... 74/572 |
| 4,842,116 | A | * | 6/1989 | Fukushima .............. 192/214.1 |
| 4,844,224 | A | * | 7/1989 | Fukushima ............... 192/70.17 |
| 4,846,323 | A | * | 7/1989 | Fukushima ............... 192/30 V |
| 5,135,089 | A | * | 8/1992 | Kovac ..................... 192/70.17 |
| 5,168,971 | A | * | 12/1992 | Kovac ..................... 192/30 V |
| 5,499,703 | A | * | 3/1996 | Kii et al. ................. 192/70.11 |
| 6,068,098 | A | * | 5/2000 | Yamamoto ................ 192/30 V |
| 6,454,654 | B2 | * | 9/2002 | Friedmann et al. ........... 464/68 |
| 6,533,665 | B2 | * | 3/2003 | Peinemann et al. .......... 464/68 |
| 6,582,312 | B2 | * | 6/2003 | Suzuki et al. ................ 464/46 |

* cited by examiner

Primary Examiner—Saúl J. Rodríguez
(74) Attorney, Agent, or Firm—Cohen, Pontani, Lieberman & Pavane (57) ABSTRACT

A torsion damping mechanism with a torsion damper with an input side and an output side, where the input side and the output side are connected elastically to each other by spring-type stored energy elements for rotation in common auxiliary mass which can rotate coaxially to the torsion damping mechanism is connected frictionally to the torsion damping mechanism by way of a friction area, where the frictional connection between the torsion damping mechanism and the auxiliary mass has a predetermined frictional moment. When this moment is exceeded during the occurrence of peaks in the torque being applied to the torsion damping mechanism, the auxiliary mass can slip or slips.

18 Claims, 9 Drawing Sheets

TORSION DAMPING MECHANISM WITH AUXILIARY MASS

BACKGROUND OF THE INVENTION

1. Field of the Invention

The present invention pertains to a torsion damping mechanism with frictionally connected auxiliary mass.

2. Description of the Related Art

Torsion damping mechanisms are used to reduce variations or peaks in the torque of a drive unit and thus to give the drive shaft behind the torsion damping mechanism a more uniform torque curve. Torsion damping mechanisms of this type are used in clutch mechanisms, for example, and in dual-mass flywheels. A torsion damping mechanism consists of an input area, usually disk-like in shape, on which torque is exerted via the peripheral areas of the one or more disks, and an output area, also usually disk-like in shape, which, in the case of clutch mechanisms, is connected to a hub, which can drive an output drive axle. The disk usually located on the output side is called the hub disk, and it is usually surrounded on both sides by cover plates, which are tightly connected to the torque-transmitting disk on the input side. Torsion damping mechanisms with one cover plate also exist. Dual-mass flywheels do not have cover plates, but they do have comparably functioning elements, namely, a primary flywheel and a cover plate, which is connected to the flywheel. The actual transmission of the torque between the output side and the input side takes place between the cover plate or plates or the flywheel/cover plate combination on the input side and the hub disk on the output side. The two elements are connected elastically to each other by spring-type stored energy elements. Upon rotation of the cover plates or of the flywheel/cover plate combination, special projections on them exert force on the spring elements, which transmit this force in turn to certain areas of the hub disk located at the other end of the spring elements. Thus the cover plates or the flywheel/cover plate combination and the hub disk all rotate around a common rotational axis. Fluctuations in the torque, which are transmitted from the input side drive to the cover plates, are filtered out to a greater or lesser extent by the spring-type stored energy elements, so that the curve of the torque at the output-side hub disk becomes more uniform.

The torsional vibration system in a clutch mechanism, for example, or in a dual-mass flywheel can be described with respect to its critical resonance speed $n_k$ as follows:

$$n_k = \text{SQRT}((1/J_1 + 1/J_2) * c * K) * 30/(\pi * Z)$$

where:

$J_1$ and $J_2$ are the inertias of the primary and secondary side;
c is/are the spring stiffness(es);
K is a correction factor with K+1 if c is given in Nm/rad or with K=180/π if c is given in Nm/degree; and
Z is the number of out-of-round events (such as ignitions in an internal combustion engine) per revolution of a drive shaft on the input side.

A disconnection can be achieved only above this rotational speed (starting at $\text{SQRT}(2) \times n_k$ as a guideline value). In the case of the dual-mass flywheel, the two inertias are approximately the same. Thus the term in parentheses reaches a minimum. In the case of a clutch disk, $J_1$ can have a value of up to $100 \times J_2$. Thus the inertia $J_2$ represents an essential "lever" by which the natural frequency of a torsional damping system with a clutch disk can be lowered.

Figure 12:
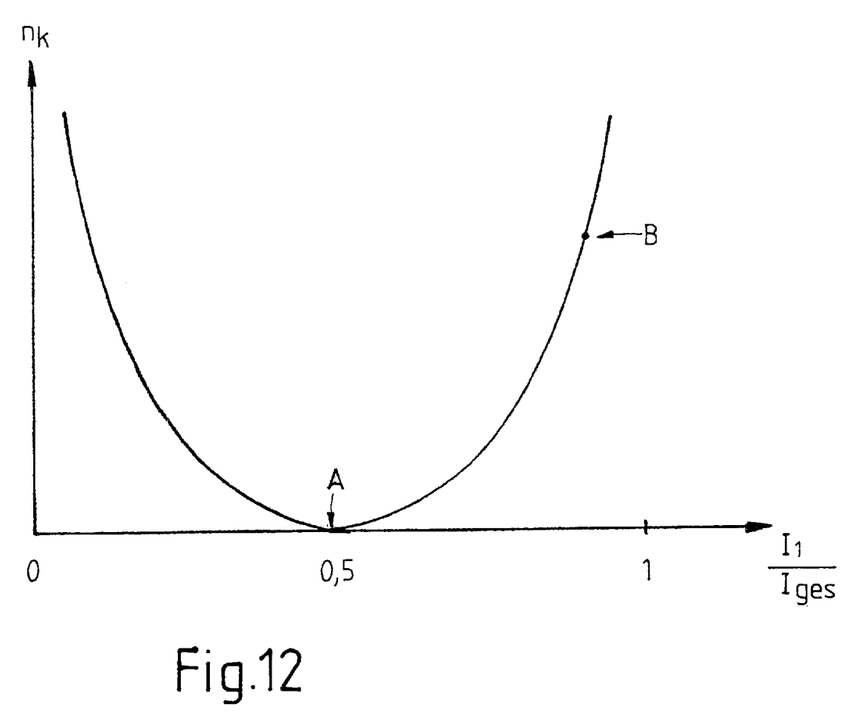
FIG. 12 shows a graph, which describes the relationship between the inertias of a torsion damping system and the critical resonance speed.

The change in the critical speed obtained by shifting the moments of inertia of the term in parentheses, including the root, from the primary to the secondary side is shown in FIG. 12. Point A characterizes here the typical ratio for a dual-mass flywheel, which can be, for example, about 60:40, whereas point B shows the ratio for a typical clutch disk. As can be seen, in the case of the dual-mass flywheel, changes will have hardly any effect because of the very wide minimum. In the case of a clutch disk, however, the resonance point of the system can be changed significantly.

A further improvement in the torque behavior can be obtained by connecting an auxiliary mass (usually by way of a damping element) to the input or to the output side of a torsion damper.

As a result, the mass moment of inertia (MMI) of the output or of the input side is greatly increased, so that at least one natural frequency of the total system is lowered and the so-called supercritical speed range of the drive is significantly increased. It is especially favorable to increase the mass moment of inertia on the output side of a torsion damping mechanism, because the mass moment of inertia is very small here in comparison to the mass moment of inertia on the input side, which means that even a very small amount of additional mass brings about a very sharp increase, in relative terms, in the mass moment of inertia on the output side. The auxiliary mass is preferably connected by way of a damping element. A damping element is preferred which is designed for dry friction, although viscous fluid damping or some other type of damping principle such as magnetic field damping or piezoelectric element damping could also be imagined. The effective friction between the auxiliary mass and the output or the input side can thus be set to any desired value within a wide range.

Especially in the case of clutch mechanisms, torsion damper disks usually have the smallest possible mass moment of inertia, because this must also be synchronized by the synchronizing device in the transmission when the clutch is released and when the gears are shifted. If, under such conditions, the mass of the input side or of the output side of a torsion damper disk is increased even more by adding extra mass, the synchronizing device in the transmission is negatively affected. For this reason, a disconnect device is positioned on the auxiliary mass to disconnect it from the torsion damper disk when the clutch is disengaged, so that the auxiliary mass does not have to be synchronized.

A torsion damping mechanism can be divided into an input side (primary side) and an output side (secondary side). The input side comprises all the elements of the torsion damping mechanism up as far as the spring-type stored energy elements, i.e., all the elements on which an external drive force acts. The output side comprises all the elements which are located on the other force-transmitting side of the spring devices, i.e., the elements which transmit the drive force further onward, including, for example, an output hub which drives an output drive shaft. As a rule, the hub disk is one of the output elements, whereas the cover plates belong to the input side. It is fundamentally possible, however, to reverse the arrangement of these elements, so that the hub disk belongs to the input side, a possibility which is also to be included within the scope of the invention.

An area of application in which torsion damping mechanisms are used includes dual-mass flywheels. These are flywheels which are connected to drives which run irregularly such as internal combustion engines to make them run more smoothly; they are usually installed upline of the clutch. Dual-mass flywheels usually consist of two coaxially aligned flywheels, which are connected to each other by a torsion damper.

In a clutch mechanism, the clutch disk is connected to the cover plates on each side of the torsion damper (or to the hub disk). In the case of conventional dual-mass flywheels, however, these components are replaced by one of the flywheels and a cover plate, all of which therefore are to be referred to as "side elements" in conjunction with the present invention. The side element located on the other side of the hub disk, i.e., the cover element, has a function similar to that of the second cover plate in a clutch mechanism, in that it closes off the entire mechanism, especially the spring-type stored energy elements. In dual-mass flywheels, this second side plate can also have an additional function, namely, to serve as a sealing element in so-called "wet-running" dual-mass flywheels.

The hub disk is connected by appropriate fastening elements such as bolts to the second flywheel.

In many designs, one of the two flywheels of the dual-mass flywheel serves simultaneously as the flywheel of a clutch mechanism, which is connected downline from the dual-mass flywheel.

Previously known added-mass flywheels are designed so that they are connected to the torsion damping mechanism when this mechanism is under load, that is, when a drive on the input side is transmitting a torque to the torsion damping mechanism. Peaks in the torque, which occur when the drive unit is running irregularly, cannot be effectively absorbed in this way and are transmitted to the output side of the torsion damping mechanism.

SUMMARY OF THE INVENTION

The present invention is therefore based on the task of providing a torsion damping mechanism with auxiliary mass which is able to damp peak torques.

This task is accomplished by the provision of a torsion damping mechanism having an auxiliary mass which can rotate coaxially with the torsion damping mechanism and which is connected to the torsion damping mechanism by a frictional connection having a frictional moment which, when exceeded during peaks in applied torque, allows the auxiliary mass to slip.

The principle on which the invention is based is to connect the auxiliary mass frictionally to the torsion damping mechanism in such a way that torque peaks are reduced by friction.

The invention therefore pertains to a torsion damping mechanism with a torsion damper with an input side and an output side, where the input side and the output side are connected to each other elastically by spring-type elements for rotation in common. The torsion damping mechanism according to the invention has an auxiliary mass, which can rotate coaxially to the torsion damping mechanism and which is connected frictionally to the torsion damping mechanism by a friction area, where the frictional connection of the torsion damping mechanism to the auxiliary mass has a predetermined frictional moment. When this predetermined value is exceeded such as during the occurrence of peaks in the torque acting on the torsion damping mechanism, the auxiliary mass slips or can slip.

As a result of the auxiliary mass frictionally connected to the torsion damping mechanism, the mass moment of inertia is increased either on the input side or on the output side (depending on whether the auxiliary mass is connected to the input side or to the output side), so that at least one natural frequency of the system is reduced and the supercritical rpm range is thus considerably expanded.

During "normal operation", that is, without the occurrence of peaks in the torque curve, the auxiliary mass runs with the same rotational velocity as the torsion damping mechanism, because the auxiliary mass adheres to the friction area. When peaks which exceed a predetermined value occur in the torque curve, the frictional torque of the friction area is no longer sufficient to hold the auxiliary mass. The auxiliary mass thus starts to slip, as a result of which relative motion occurs between the friction area of the torsion damping mechanism and the auxiliary mass. This has the effect of dissipating energy, as a result of which the peaks in the torque acting on a drive train into which the torsion damping mechanism according to the invention has been incorporated are capped, and the rotational irregularities are thus reduced.

The influence of an elasticity provided in series with the coulomb friction is preferably kept small in this case, in that the elasticity preferably has a value of at least 100 Nm/degree. In addition, the moment introduced into the auxiliary mass corresponds essentially to the frictional moment acting on the friction area; that is, any elasticity (elastic element) which may be in parallel with the friction between the torsion damper and the auxiliary mass is almost completely excluded.

If desired, the torsion damping mechanism can comprise not only the actual torsion damper itself but also additional elements such as a flywheel or a toothed wheel. In the case of dual-mass flywheels, one of the flywheels is a component of the side elements and can in this case also be considered a part of the torsion damper.

The auxiliary mass is preferably connected by way of a damping element. It is preferable to use a damping element which is designed for dry friction, although viscous fluid damping or some other damping principle such as magnetic field damping or piezoelectric element damping could also be imagined. The effective frictional moment between the auxiliary mass and the output side or the input side can thus be set to any desired value within relative wide limits.

The freedom of coaxial rotation of the torsion damper and the auxiliary mass can be achieved, for example, by providing the auxiliary mass with radial support on a part of the torsion damper such as on a hub or on a flywheel.

Depending on how the auxiliary mass and the torsion damper are arranged, an elastic element which presses the auxiliary mass against the friction area can be provided between the torsion damping mechanism and the auxiliary mass.

The torsion damping mechanism can also have a flywheel arrangement, and the auxiliary mass can be connected by friction to the flywheel arrangement. The flywheel arrangement can preferably belong to the input side or to the output side of the torsion damper.

The flywheel arrangement can, for example, have a flywheel, a cover plate on the flywheel, and a friction plate extending in the radial direction from the cover plate. The auxiliary mass is supported radially on the circumference of the cover plate or of the flywheel, is frictionally connected axially to the friction plate, and is provided with an elastic element acting in the axial direction, which holds the auxiliary mass between the friction plate and the flywheel.

A "radial" direction in the present invention is to be understood as a direction which proceeds away from the rotational axis or towards it. "Axial" in the sense of the present invention means that the elements are arranged along a line parallel to the rotational axis.

A flywheel arrangement can also be provided on a hub disk, which, for example, can form the central area of a torsion damper (typically surrounded by side elements). In this case, for example, the flywheel arrangement can have a flywheel, which is mounted on the hub disk, and the auxiliary mass can be supported radially on the flywheel so that it extends between the flywheel and the hub disk; the auxiliary mass is frictionally connected axially to the flywheel, and an elastic disk, which presses the auxiliary mass against the flywheel, is provided axially between the auxiliary mass and the hub disk. In this preferred embodiment, therefore, in contrast to the embodiment described previously, the auxiliary mass rubs directly against the flywheel and not against a friction plate provided especially for the purpose. The arrangement of the elastic element also deviates in this case form the previously described design.

In this case, the side elements can have an additional flywheel, which is mounted on either the input side or the output side of the torsion damper, namely, on the side to which the hub disk does not belong. If, therefore, the hub disk is on the input side, the additional flywheel is mounted on the output side and vice versa.

According to another embodiment of the invention, the flywheel arrangement has a first flywheel, which is mounted on a hub disk; the auxiliary mass is supported radially on the first flywheel and extends between the flywheel and the hub disk; and the auxiliary mass is connected axially to the flywheel in a frictional manner. An elastic element, which presses the auxiliary mass against the flywheel, is provided axially between the auxiliary mass and the side of the torsion damper to which the hub disk does not belong, i.e., either the input side or the output side. In this design, therefore, the auxiliary mass is supported by the elastic element on a side of the torsion damper different from that to which it is frictionally connected. If, for example, the auxiliary mass is supported on a flywheel which belongs to the input side, then the elastic element is mounted between the auxiliary mass and the output side.

In addition, the side elements can have a second flywheel on the side to which the hub disk does not belong, which second flywheel extends farther outward radially than the hub disk, the elastic element being located axially between the auxiliary mass and this second flywheel. In this embodiment, therefore, the elastic element and thus the auxiliary mass are supported on the additional flywheel. Because this extends farther outward than the hub disk, the circumferential area of the flywheel is accessible, when looked at from above, because the hub disk does not block it in this embodiment. The elastic element and indirectly the auxiliary mass can thus be supported against this circumferential area of the flywheel.

In another embodiment, the flywheel arrangement can have a first flywheel, which is mounted on a hub disk, and a second flywheel, which is mounted on the other side of the torsion damper. The auxiliary mass is supported radially on the second flywheel, and essentially all of it is radially inside the first flywheel; this auxiliary mass is frictionally connected axially to the first flywheel. In addition, an elastic element is provided, which rubs axially against the auxiliary mass (6) and holds it between the first flywheel (12) and a support element (27) mounted on the first flywheel.

This embodiment differs from those previously described with respect to the support of the auxiliary mass. Whereas, in the previously described embodiments, this mass was always on the side, i.e., either on the input side or on the output side, of the torsion damping mechanism against which the auxiliary mass also rubbed, here, in this embodiment, it is supported on the other side and therefore not on the area to which it is frictionally connected.

The description of the various aspects of the present invention presented above does not include an explanation of how the auxiliary mass can rotate around its support and provides no details on its friction area. One possibility is that the auxiliary mass can rotate freely; that is, it is possible in principle for the auxiliary mass to rotate around a complete 360°. For certain embodiments, however, it can also be preferable to limit the rotation of the auxiliary mass around its radial support tangentially by stops, with the result that the auxiliary mass cannot rotate around a full 360°. "Tangential" is understood here to mean that points on a plane of rotation which are adjacent to each other in the tangential direction can be converted into each other by rotation. A tangential movement is therefore the movement of a point in a rotational direction which causes no change in its radial distance.

The stops in this case can have at least one stop element, a first area of which is mounted on the torsion damping mechanism, whereas a second area engages with recesses in the auxiliary mass. The tangential ends of the recesses thus limit the relative movement of the stop in the recess. What is present here is therefore a system of grooves, into which a projection can engage but which can move only within the boundaries of the groove.

The first area of the minimum of one stop can be mounted on a flywheel of the torsion damper. If the connection of the auxiliary mass and the attachment of the stops are on the same side of the torsion damping mechanism, the movement of the auxiliary mass is then limited. As a result, the auxiliary mass cannot reach high differential rotational speeds relative to the connected side, so that the amount of energy dissipated by the relative motion is reduced and wear is minimized. If, however, the connection of the auxiliary mass and the attachment of the stops are on different sides of the torsion damping mechanism, the auxiliary mass acts as a carried-along friction ring subject to the mass moment of inertia.

In addition to the advantage described above, the resonance behavior in particular is improved by the additional carry-along friction between the input side and the output side. Thus the first area of the minimum of one stop can be on the flywheel to which the auxiliary mass is not frictionally connected, or the first area of the minimum of one stop can be on the same flywheel as the auxiliary mass.

The torsion damping mechanisms according to the invention described so far can be used in particular as part of a dual-mass flywheel.

In another embodiment, which is especially suitable for clutch mechanisms, the torsion damping mechanism also has an output hub, that is, a hub which, in terms of the direction in which the force is flowing, is downstream from the torsion damper and which serves to transmit the torque to, for example, a transmission. The auxiliary mass in this case is supported radially on this output hub and is frictionally connected axially to the hub disk.

In this embodiment, an elastic element can be mounted radially on the output hub, which element presses the auxiliary mass axially against the hub disk. As already mentioned, the torsion damping mechanism in this case can preferably be a part of a clutch mechanism.

To lower costs, the radial bearing which could be used for the auxiliary mass is located as far as possible radially toward the inside; in particular, it should be radially inside the crankshaft bolts. For this purpose, a drive shaft with a plurality of fastening elements arranged in a circle concentric to the rotational axis can be attached to the side elements or to the hub disk, and the auxiliary mass can be supported radially inside the radius of the fastening elements.

The action of the auxiliary mass depends on the ratio of the mass moments of inertia between the auxiliary mass and the side of the torsion damping mechanism to which the auxiliary mass is connected by friction. In particular, it is preferred that the ratio of the mass moments of inertia between the auxiliary mass and the part of the torsion damping mechanism to which the auxiliary mass is connected be at least 0.1.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

The invention makes available a torsion damping mechanism with a connected auxiliary mass. The key aspects of the invention are that the auxiliary mass is connected frictionally to the torsion damping mechanism and that the frictional moment is preset in such a way that, when peaks occur in the torque, the frictional connection slips and energy is dissipated.

There is a wide variety of ways in which the arrangement of the various elements can be concretely realized. The auxiliary mass can exert its friction either on the input side or on the output side of a torsion damping mechanism. For example, the friction can be exerted on an input flywheel or on an output flywheel, on the side elements and cover plates of the input side or output side, or on a hub disk.

If an elastic element such as a disk spring is used to produce a defined pressure on the friction surface, this elastic element can also be located on any one of the various parts of the torsion damping mechanism according to the invention as long as this spring, in combination with the frictional connection of the auxiliary mass, can exert pressure on the friction surface.

Finally, the radial support and the concrete shape of the auxiliary mass can also be varied within wide limits. Thus, the auxiliary mass can be supported on the cover plate of a dual-mass flywheel; on the output flywheel of the dual-mass flywheel; or on the input flywheel of a dual mass flywheel, where this input flywheel can also have a special design with projections or an input-side hub which allows the attachment of a radial bearing. The auxiliary mass can also be located between the torsion damper and the flywheel (especially the output flywheel) or radially inside this output flywheel.

If the auxiliary mass, possibly by way of a damping element, is connected to the output side of a torsion damper disk, the mass moment of inertia of the output side is considerably increased, so that the natural frequencies of the system are reduced and the supercritical speed range is increased. It is especially suitable to use the present invention to increase the mass moment of inertia of the output side of a torsion damper disk, because the mass moment of inertia is very low at this point in comparison to the mass moment of inertia of the input side, which means that even a very small amount of auxiliary mass brings about a very large increase in the mass moment of inertia of the output side in relation to the input side.

It is preferable for the damping element to be designed for dry friction. The effective frictional moment between the auxiliary mass and the input side or the output side can thus be set to any desired value within wide limits.

Figure 1:
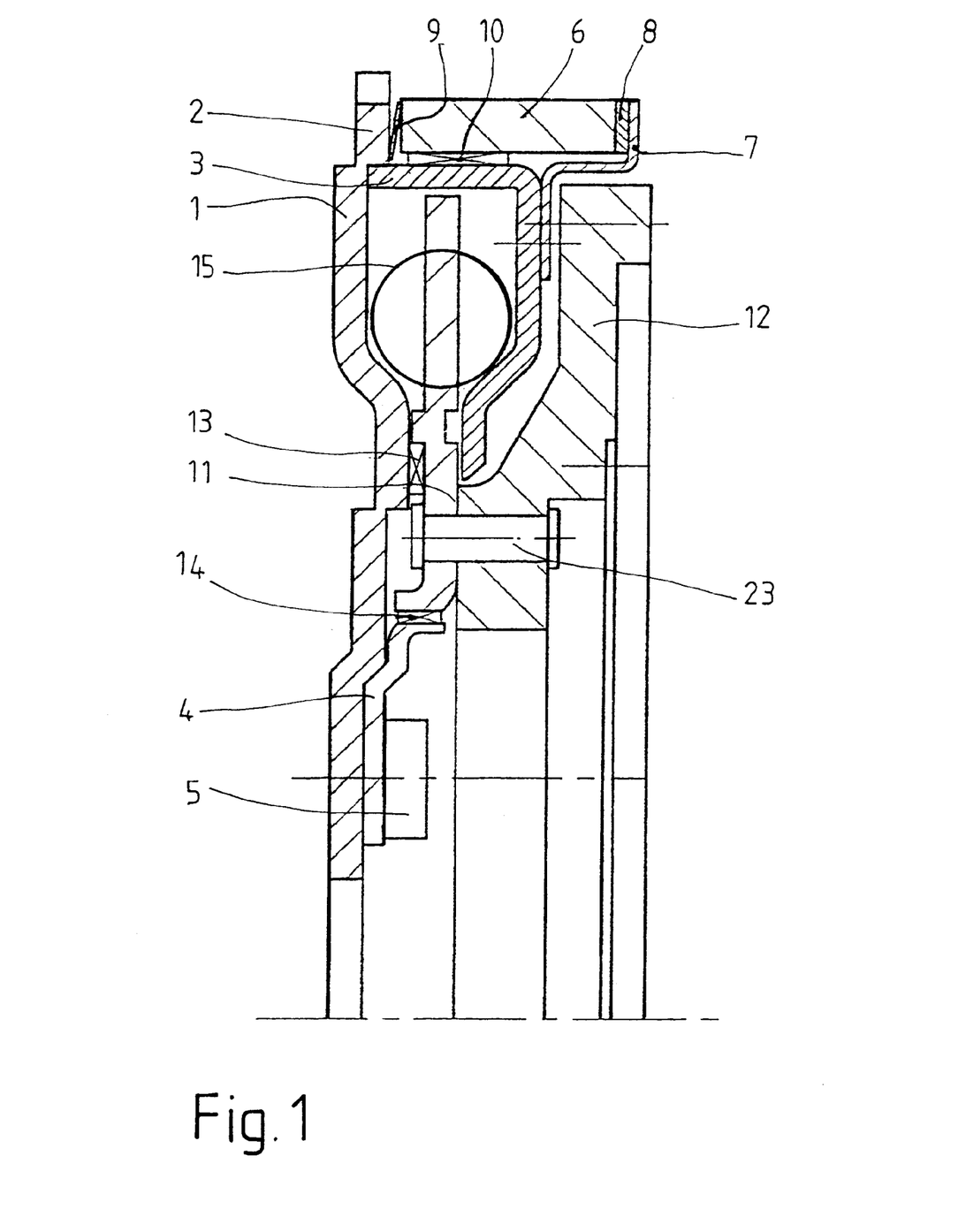
FIG. 1 shows a first embodiment of the torsion damping mechanism according to the present invention, in which the auxiliary mass is mounted radially on the outside on the torsion damping mechanism.

FIG. 1 shows a first exemplary embodiment of a torsion damping mechanism according to the present invention for use in a dual-mass flywheel. FIG. 1 shows a dual-mass flywheel, which comprises a primary flywheel 1, a ring gear 2 (to drive the flywheel from a starter motor while the engine connected to it is being started up), a cover plate 3, and a shim plate 4 on the input side, whereas the output side comprises a secondary flywheel 12 and a hub disk 11. The hub disk 11 and the secondary flywheel 12 are connected tightly to each other by circularly arranged bolts 23.

The force is transmitted between the input side and the output side by way of appropriately formed elements, which are supported on both sides of the springs 15 and thus transfer the torque in an elastic manner. The output side is supported on the input side, for which purpose an axial bearing 13 and a radial bearing 14 mounted on the shim plate 4 are used. The axial support by the axial bearing 13 is accomplished with the help of, for example, a buffer disk between the primary flywheel and the hub disk.

If the dual-mass flywheel is being used in a clutch mechanism, the secondary flywheel can simultaneously be the input flywheel of the clutch mechanism, so that the clutch disk and the pressure plate, neither of which is shown, can then belong to the output side. A clutch disk of this type can also have an input damper.

According to the invention, an auxiliary mass 6 is provided, which, in the present exemplary embodiment, is connected to the input side by dry friction.

The auxiliary mass 6 according to the invention is supported on the outside circumference of the cover plate 3 by means of a radial bearing 10. A friction plate 7, which first proceeds away from the cover plate in the axial direction and then is bent radially outward to form an "S" shape overall, is also attached axially to the cover plate 3; the friction ring 8 mounted on the auxiliary mass 6 rubs against this friction plate. An elastic element 9, such as a disk spring, is located at the end of the auxiliary mass 6 opposite the end on which the friction ring 8 is located and where the friction thus occurs; this elastic element is thus held between the auxiliary mass 6 and the ring gear 2. It is equally conceivable, however, that an outward-bent area of the cover plate could serve as a support for the disk spring 9 or that a radially outward-projecting extension of the flywheel 1 itself could do so.

In this exemplary embodiment, therefore, the radial bearing 10 of the auxiliary mass 6, the friction area in the form of the friction plate 7 of the cover plate 3, and the elastic element 9 are all on one side, usually the input side in the case of the illustrated embodiment of the dual-mass flywheel. When relative motion occurs between the auxiliary mass 6 and the input side, coulomb friction develops between the friction plate 7 connected to the cover plate 3 and the friction ring 8 connected to the auxiliary mass 6. The elastic element 9 in the form of the disk spring 9, supported on the primary flywheel or on the gear wheel 2, absorbs the axial pressure directed toward the friction plate 7. Friction also occurs on both sides of the disk spring 9. It is therefore possible to say that the frictional connection of this arrangement is closed on the primary side.

A defined frictional force is applied via the disk spring 9 and the friction ring 8 between the auxiliary mass 6 and the input side of the torsion damping mechanism according to the invention. As a result, the mass moment of inertia of the auxiliary mass 6 is connected to the input side. When now, during operation, peaks occur in the torque curve which are larger than the frictional moment acting between the input side and the auxiliary mass 6, the auxiliary mass 6 will try to remain where it is as a result of its inertia. Thus relative motion occurs, and simultaneously friction develops between the auxiliary mass 6 and the input side arrangement, so that the torque peaks are damped and not transmitted.

Figure 7:
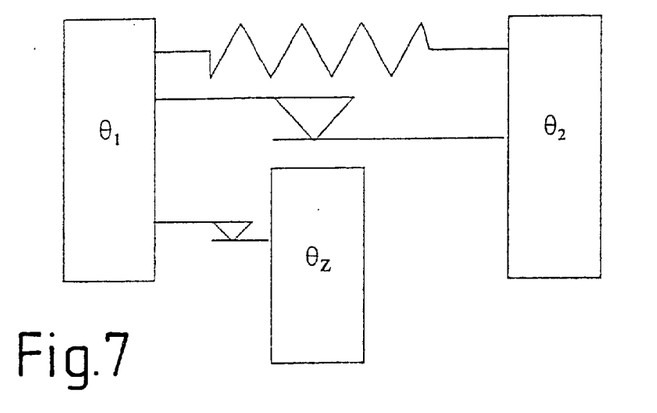
FIG. 7 shows a general connection diagram with the connection of the auxiliary mass to the input side.

The way in which the connection is established is shown again in schematic fashion in FIG. 7, from which it can be seen that the mass moment of inertia $\Theta_1$ of the input side is transmitted via elasticity and friction, provided by a conventional friction ring, for example, to an output side mass moment of inertia $\Theta_2$. The mass moment of inertia $\Theta_Z$ of the auxiliary mass is connected here by friction to the input side mass moment of inertia $\Theta_1$.

Figure 2:
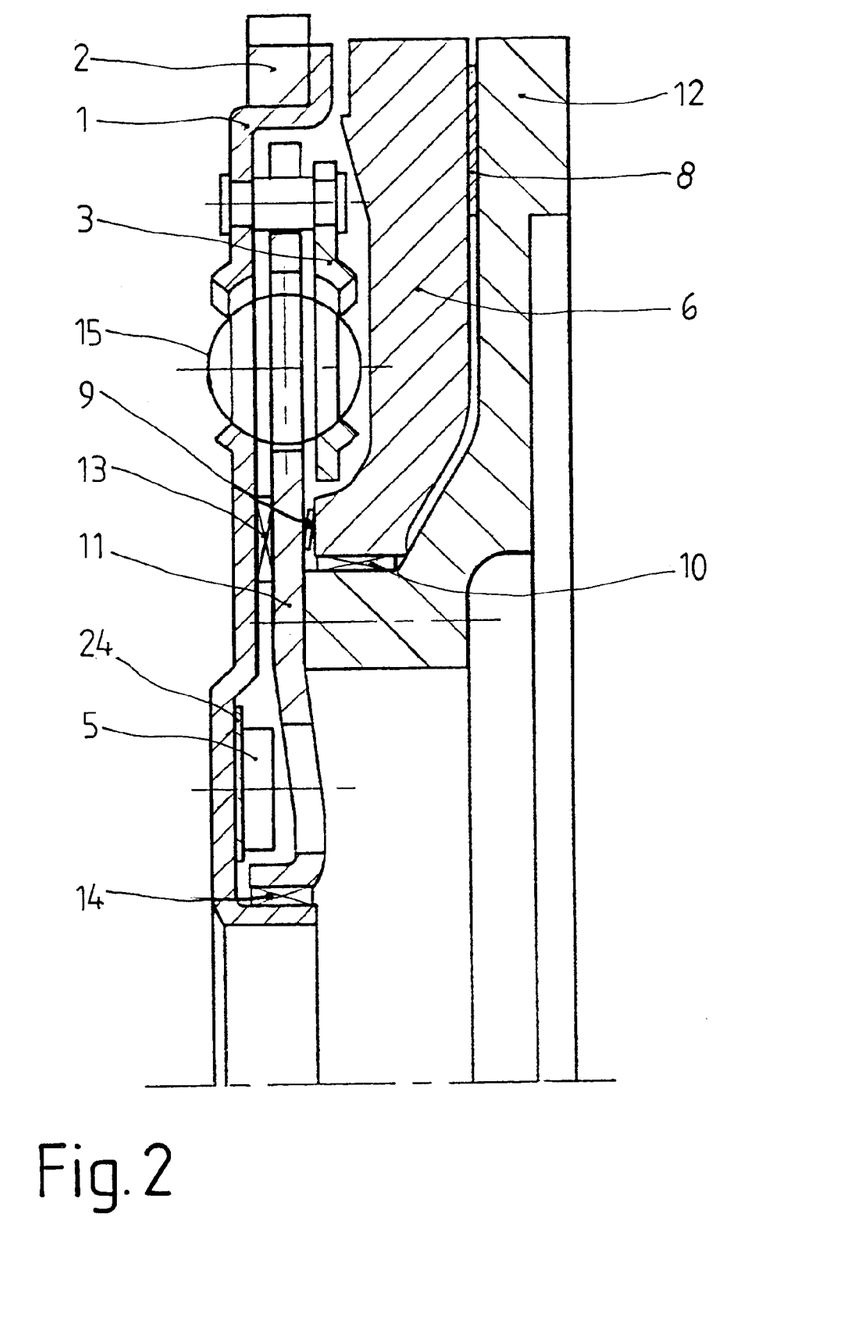
FIG. 2 shows a second embodiment of a torsion damping mechanism according to the present invention, in which the auxiliary mass is mounted between the flywheel and the torsion damper.

FIG. 2 shows another embodiment of a torsion damping mechanism according to the present invention for use in another dual-mass flywheel.

The basic design of the dual-mass flywheel shown here is the same as that of FIG. 1. The same reference numbers are intended to identify similar elements, so that reference can be made to the description of FIG. 1 with respect to the general design of the torsion damping mechanism of the present embodiment. The radial bearing 14, which supports the hub disk 11, is in this case not mounted on a shim plate but rather on a bent section or a hub of the primary flywheel 1. The crankshaft bolt 5 is fixed here to the primary flywheel 1 with the help of a washer 24. In contrast to the exemplary embodiment shown in FIG. 1, the auxiliary mass 6 according to the invention is connected to the output side by dry friction. For this purpose, it is arranged between the input side primary flywheel 1 or its cover plate 3 and an appropriately designed secondary flywheel 12 and is supported on the secondary flywheel 12 by means of a radial bearing 10.

In this case, the auxiliary mass 6 extends a good distance into the torsion damping mechanism and therefore has a large radial dimension. The auxiliary mass 6 is held axially between the secondary flywheel 12 and the input side by way of a friction ring 8. The pretensioning force is supplied by a disk spring 9, located between the input side, i.e., the hub disk 11 in the present case, and the auxiliary mass 6.

Figure 8:
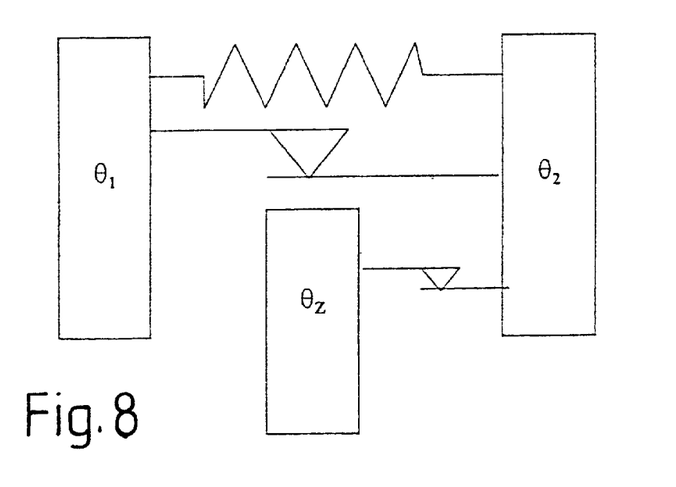
FIG. 8 is a schematic connection diagram showing how the auxiliary mass is connected to the output side of the torsion damping mechanism.

In this design of the torsion damping mechanism according to the invention, the frictional connection is closed on the output side. The way in which the connection is established is shown again in schematic fashion in FIG. 8, from which it can be seen that the mass moment of inertia $\Theta_1$ of the input side is transmitted by way of elasticity and friction, which can be supplied by a conventional friction ring, for example, to an output side mass moment of inertia $\Theta_2$. The mass moment of inertia $\Theta_Z$ of the auxiliary mass is connected in this case via friction to the output side mass moment of inertia $\Theta_2$.

Figure 3:
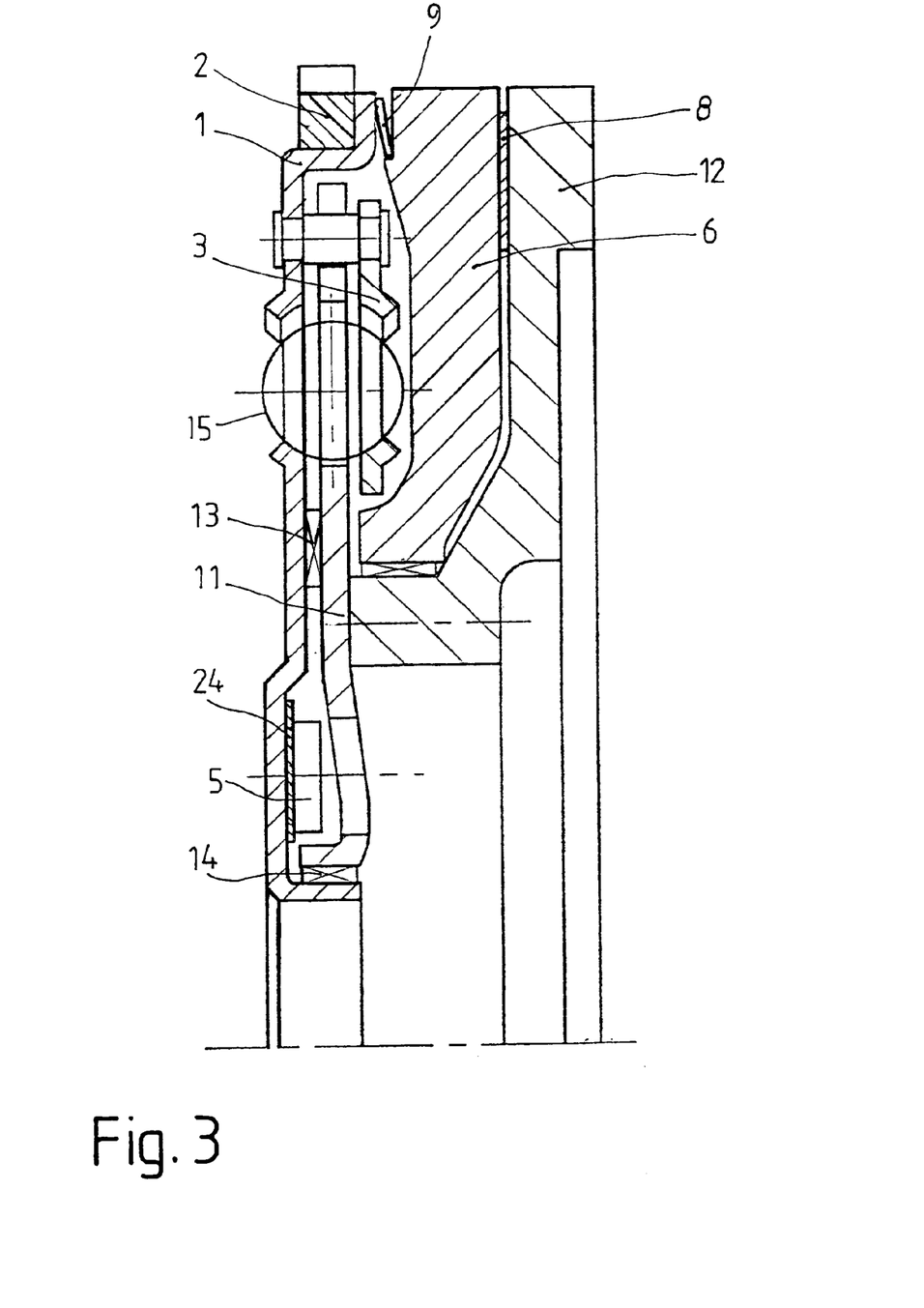
FIG. 3 shows a third embodiment of a torsion damping mechanism according to the present invention, in which the elastic element is supported against a second flywheel.

FIG. 3 shows another embodiment of the torsion damping mechanism according to the present invention, which has essentially the same design as that of the exemplary embodiment shown in FIG. 2, so that reference can be made again in this regard to the general description given above.

In contrast to the embodiment of FIG. 2, the disk spring 9 is located radially on the outside between the primary flywheel 1 and the auxiliary mass 6, so that the auxiliary mass 6 is therefore held between the input side and the output side of the torsion damping mechanism.

Figure 9:
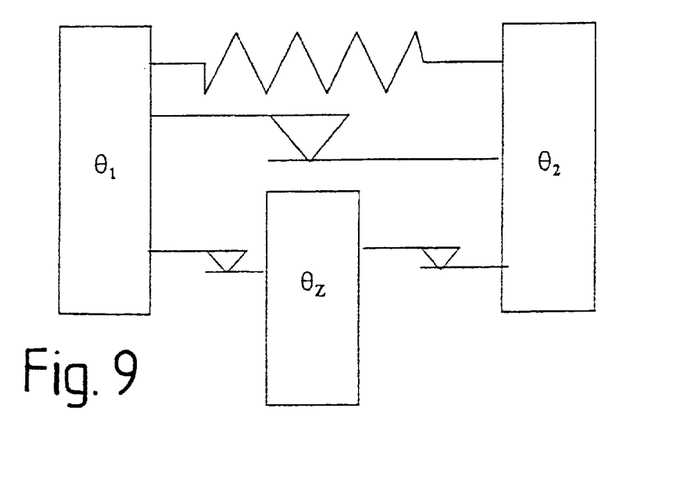
FIG. 9 is a schematic connection diagram of a torsion damping mechanism according to the present invention, in which the auxiliary mass is connected both to the input side and to the output side.

As can be seen from FIG. 9 by way of example, the disk spring also exerts friction, so that the mass moment of inertia of the input side $\Theta_1$ is also connected by friction to the mass moment of inertia $\Theta_Z$ of the auxiliary mass 6, and this in turn is in frictional contact with the output side mass moment of inertia $\Theta_2$ of the secondary flywheel.

Figure 4A:
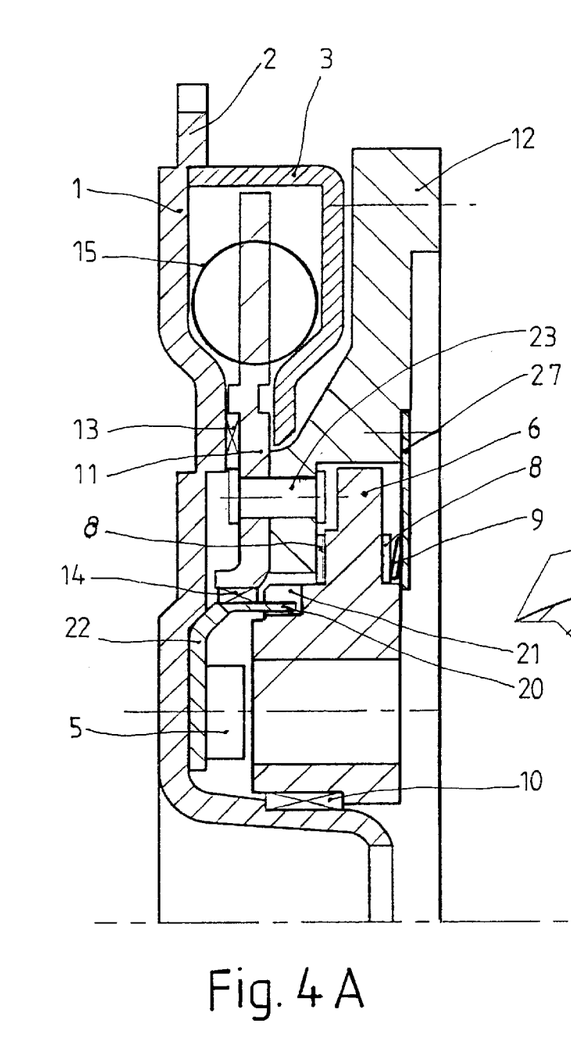
FIG. 4A shows a fourth embodiment of a torsion damping mechanism according to the present invention, in which the auxiliary mass is supported farther inward in the radial direction.

FIG. 4A shows another preferred embodiment of the torsion damping mechanism according to the present invention, which, like the embodiment of FIG. 1, represents a dual-mass flywheel.

The same reference numbers as those used in FIG. 1 represent the same elements of the illustrated torsion damping mechanism here. The auxiliary mass 6 in this embodiment is supported radially on the inside by means of a radial bearing 10 on the primary flywheel 1. The disk spring 9 holds the auxiliary mass 6 axially between the secondary flywheel 12 via a friction ring 8 and a support element 27 mounted on the secondary flywheel 12 by way of a second friction ring 8.

The disk spring 9 provides the required pretensioning force. In this embodiment, the frictional connection is closed on the output side. So that the rotational movement of the auxiliary mass 6 can be limited, this embodiment also shows stops in the form of control projections 20, which are provided on a stop element 22.

In the present embodiment, the stop element 22 also functions as the shim plate 4 of FIG. 1; it therefore serves simultaneously as a support area for the radial bearing 14, which supports the hub disk 11 and the secondary flywheel 12. This stop element and the primary flywheel 1 are attached simultaneously by means of the bolt 5 to the crankshaft 1.

Figure 4B:
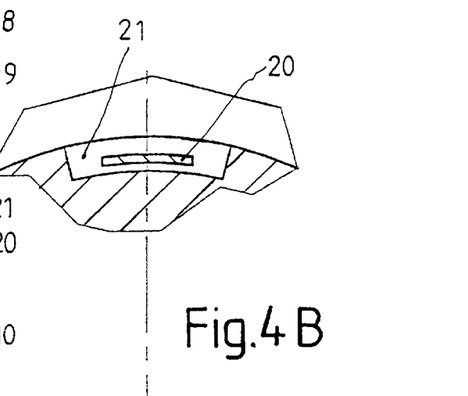
FIG. 4B shows the stops which limit the rotational freedom of the auxiliary mass.

The control projections 20 fit into recesses in the auxiliary mass 6, which are larger by a defined clearance angle than the control projections. The physical relationships can best be understood on the basis of FIG. 4B.

Figure 10:
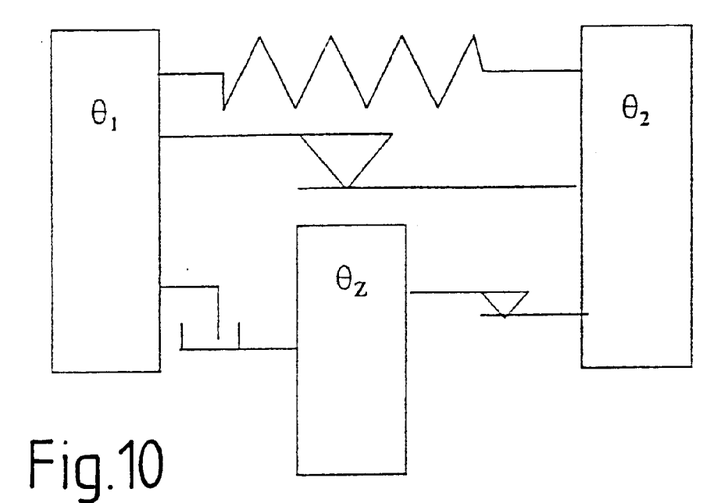
FIG. 10 is a schematic connection diagram of another embodiment of the present invention, showing how the auxiliary mass is connected to the output side and how the rotation of the auxiliary mass is limited by stops on the input side.

The connection diagram is shown in FIG. 10. Here an appropriate symbol shows that, after a certain relative rotation of the auxiliary mass, the mass moment of inertia $\Theta_z$ comes into solid engagement with the mass moment of inertia $\Theta_1$ of the input side, and thus the condition is created for the direct transmission of force.

Figure 5:
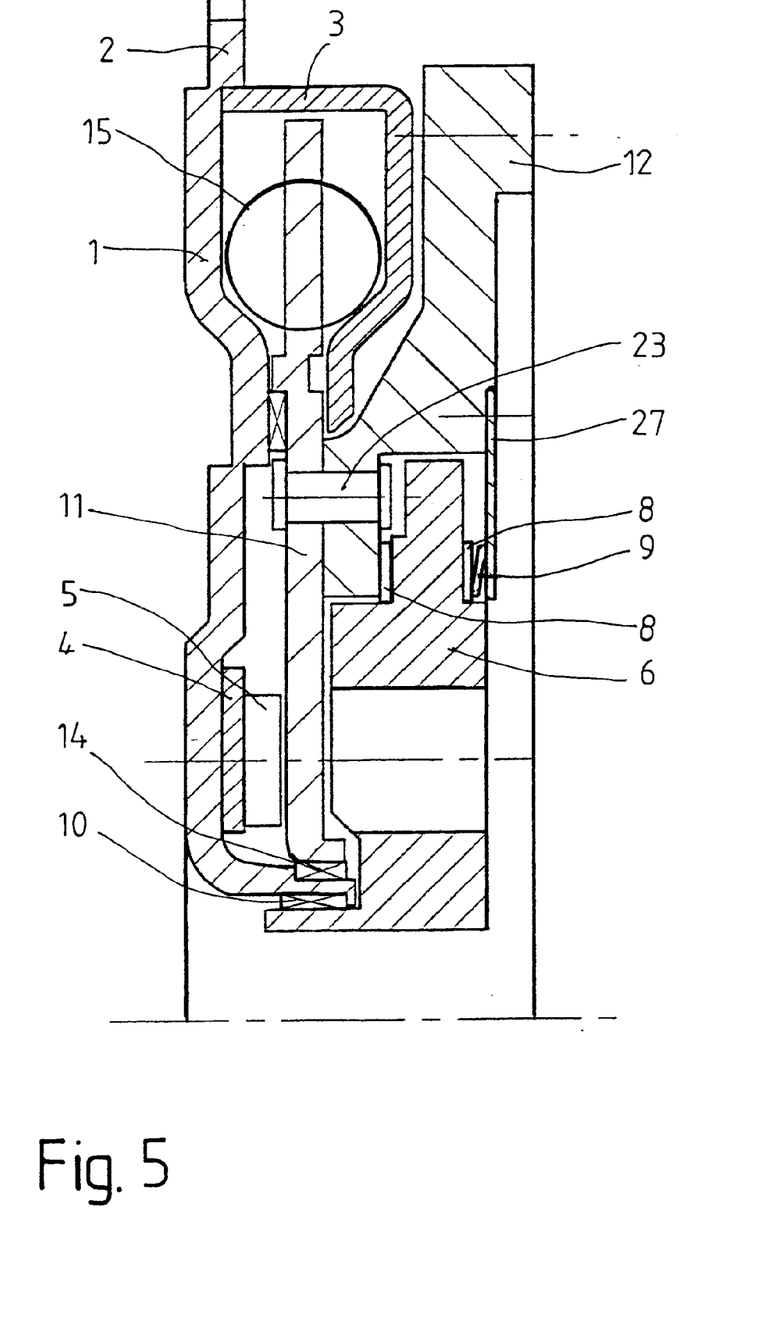
FIG. 5 shows a fifth embodiment of a torsion damping mechanism according to the present invention, in which the radial bearing of the auxiliary mass differs in design from that of the fourth embodiment.

FIG. 5 illustrates the principle of the radial displacement of the auxiliary mass toward the inside, that is, toward the rotational axis. Although identical in its basic design to the mechanism shown in FIG. 4, the mechanism here provides for the support of the auxiliary mass radially inside the hub of the primary flywheel. The bearing 10 can thus be brought to the radially inner side of the hub of the primary flywheel 1. In this case, no control projections or other contact elements are provided, which means that the auxiliary mass can rotate freely in this case.

Figure 6:
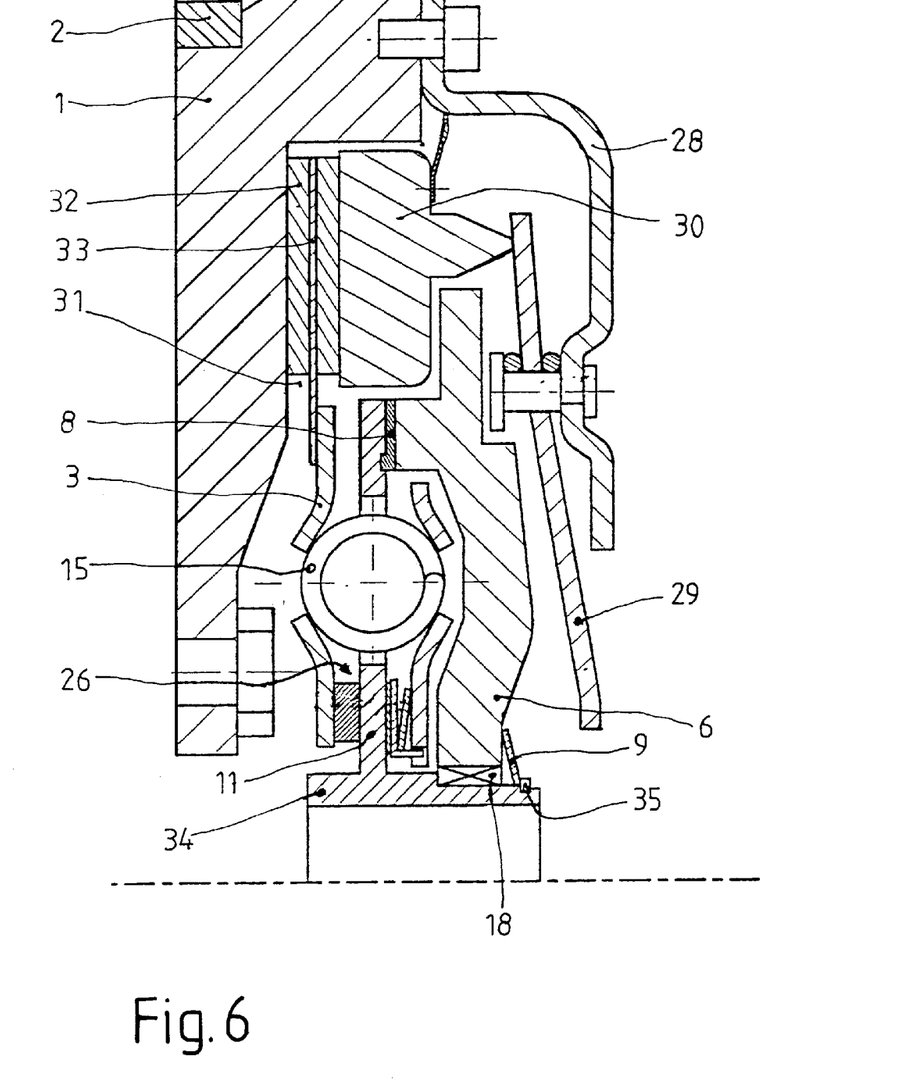
FIG. 6 shows another embodiment of a torsion damping mechanism according to the present invention for use in a clutch mechanism instead of in a dual-mass flywheel as shown in the embodiments described previously.

FIG. 6, finally, shows an application of a torsion damping mechanism according to the invention to a conventional clutch. This has a flywheel 1 with a ring gear 2. The flywheel acts by way of a pressure plate housing 28 and a pressing mechanism 29 to press a pressure plate 30 against a clutch disk 31 with linings 32 and a lining spring 33. The cover plates 3 are connected by springs 15 to the hub disk 1. A friction device 26 serves as a damping element.

The auxiliary mass 6 according to the invention is supported radially by means of a radial bearing 18 on an output hub 34, which is connected to the hub disk 11, and is frictionally connected by way of a friction ring 8 to the hub disk 11. A disk spring 9, which is mounted with the help of a locking element 35 radially on the outside on the output hub 34, presses the auxiliary mass 6 against the hub disk 11. The auxiliary mass is connected by dry friction to the output side. The support on the output hub 34 is radial and characterized by low friction. The auxiliary mass can be mounted either on the input side or on the output side; for example, it could be mounted on the hub disk 11, on the clutch disk 31, or on the cover plates 3. Coulomb friction develops between the output side and the auxiliary mass 6 by way of the friction ring 8, which is connected nonrotatably to the hub disk 11. In parallel, there is also coulomb friction between the auxiliary mass 6 and the disk spring 9.

Figure 11:
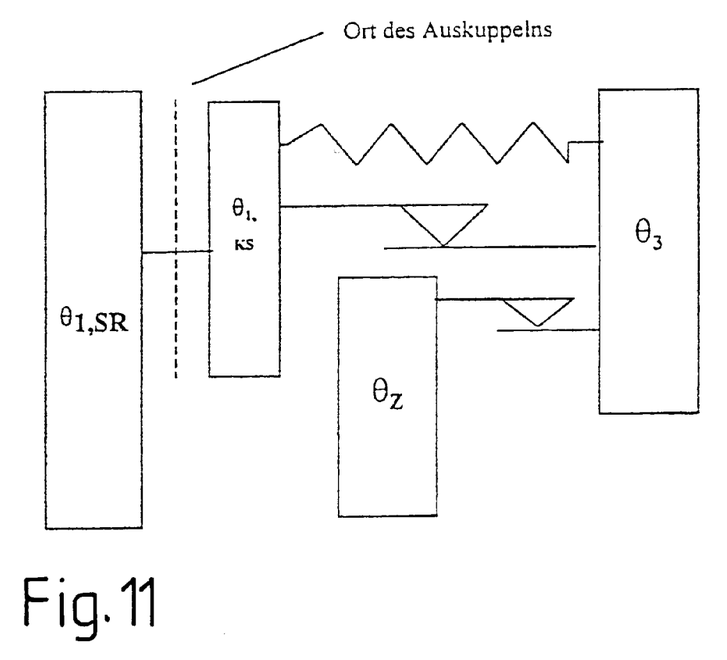
FIG. 11 shows a schematic connection diagram of a clutch mechanism according to the present invention, in which the additional mass is connected to the output side.

The schematic connection diagram shown in FIG. 11 illustrates the torque transmission relationships of this embodiment of the invention.

When the principles according to the invention are applied to a torsion damping mechanism, the result is obtained that torque peaks coming from the engine or from the transmission, i.e., peaks which exceed the preset frictional moment between the auxiliary mass and the torsion damper, cause the auxiliary mass to slip, whereupon energy is dissipated. In this way, the torque peaks in a powertrain are capped, and thus irregularities in the rotational behavior are reduced.

The advantages of the invention are to be seen in a reduction in the natural frequency, in the above-mentioned capping of the torque peaks, and in lowered costs as a result of the possibility of using smaller bearings.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A torsion damping mechanism comprising
    an input side comprising a primary flywheel to which torque is applied,
    an output side comprising a secondary flywheel to which torque is transmitted,
    spring-type stored energy elements permanently connecting said input side and said output side for rotation in common about a rotational axis, and
    an auxiliary mass which can rotate about said axis and has a frictional connection to one of said input side and said output side, said auxiliary mass having a predetermined frictional moment which, when exceeded during peaks in torque applied to said input side, causes said auxiliary mass to slip with respect to said one of said input side and said output side.

2. A torsion damping mechanism as in claim 1 further comprising an elastic element between the auxiliary mass and the other of said input and said output side, said elastic element pressing said auxiliary mass toward said frictional connection.

3. A torsion damping mechanism as in claim 1 further comprising a plurality of fastening elements for fastening said input side to a drive shaft, said fastening elements being arranged on a circle concentrically to said rotational axis, said auxiliary mass being supported radially inside said circle.

4. A torsion damping mechanism as in claim 1 wherein said auxiliary mass is frictionally connected to said input side.

5. A torsion damping mechanism as in claim 1 wherein said auxiliary mass is frictionally connected to said output side.

6. A torsion damping mechanism as in claim 1 further comprising
    a cover plate mounted on said primary flywheel, said auxiliary mass being supported radially on one of said cover plate and said primary flywheel,
    a friction plate extending radially from said cover plate, said auxiliary mass being frictionally connected to said friction plate, and an elastic element which holds said auxiliary mass axially between said friction plate and said flywheel.

7. A torsion damping mechanism as in claim 1 further comprising a hub disk on which said secondary flywheel is mounted, said auxiliary mass being supported radially on said secondary flywheel and extending between said secondary flywheel and said hub disk, said auxiliary mass being frictionally connected axially to said flywheel, and an elastic element between the auxiliary mass and the hub disk, said elastic element pressing the auxiliary mass against the secondary flywheel.

8. A torsion damping mechanism as in claim 1 wherein said auxiliary mass has a mass moment of inertia and said one of said input side and said output side to which it is connected has a mass moment of inertia, said mass moment of inertia of said auxiliary mass having a ratio of at least 0.1 with respect to said mass moment of inertia of said one of said input side and said output side.

9. A torsion damping mechanism as in claim 1 further comprising a hub disk on which said secondary flywheel is mounted, said auxiliary mass being supported radially on said secondary flywheel and extending between said secondary flywheel and said hub disk, said auxiliary mass being frictionally connected axially to said secondary flywheel, and an elastic element between the auxiliary mass and said input side, said elastic element pressing the auxiliary mass against the secondary flywheel.

10. A torsion damping mechanism as in claim 9 wherein said primary flywheel extends radially outward beyond the hub disk, said elastic element being located axially between said auxiliary mass and said primary flywheel.

11. A torsion damping mechanism as in claim 1 wherein said auxiliary mass being supported radially on said primary flywheel and extends radially inside said secondary flywheel, said auxiliary mass being frictionally connected axially to said secondary flywheel, said mechanism further comprising a hub disk on which said secondary flywheel is mounted, a support element on said secondary flywheel, and an elastic element between said auxiliary mass and said support element, said elastic element pressing the auxiliary mass against the secondary flywheel.

12. A torsion damping mechanism as in claim 1 further comprising stops which limit the rotation of the auxiliary mass about the axis.

13. A torsion damping mechanism as in claim 12 wherein said stops comprise a stop element fixed to one of said input and output sides, said auxiliary mass having a recess in which said stop element engages, said recess having tangential ends which limit relative motion of the stop element in the recess.

14. A torsion damping mechanism as in claim 13 wherein said stop element is fixed to one of said flywheels.

15. A torsion damping element as in 14 wherein said auxiliary mass is not frictionally connected to said one of said flywheels.

16. A torsion damping mechanism as in claim 14 wherein said auxiliary mass is frictionally connected to said one of said flywheels.

17. A torsion damping mechanism as in claim 1 further comprising an output hub on which said auxiliary mass is supported radially, said output hub having a radially extending hub disc, said auxiliary mass being frictionally connected axially to said hub disc.

18. A torsion damping mechanism as in claim 17 further comprising an elastic element mounted radially on said output hub, said elastic element pressing said auxiliary mass axially against said hub disc.

* * * * *